United States Patent [19]

van der Weide et al.

[11] 4,152,121
[45] May 1, 1979

[54] INSTALLATION FOR SUPPLYING GASEOUS FUELS, SUCH AS LPG OR NATURAL GAS, TO A COMBUSTION ENGINE

[75] Inventors: Jouke van der Weide, Rijswijk; Gustaaf L. van Wechem, Berkel en Rodenrijs, both of Netherlands

[73] Assignee: Nederlandse Organisatie voor Toegepast Natuurwetenschappelijk Onderzoek ten Behoeve van Nijverheid, Handel en Verkeer, The Hague, Netherlands

[21] Appl. No.: 798,676

[22] Filed: May 19, 1977

[30] Foreign Application Priority Data

May 26, 1976 [NL] Netherlands .......................... 7605655

[51] Int. Cl.² .............................................. B01F 3/02
[52] U.S. Cl. ................................. 48/180 C; 48/180 P; 123/120; 261/69 R
[58] Field of Search ............. 48/180 C, 180 P, 180 R; 123/120, 179 G; 261/69 R, DIG. 19; 251/61.5

[56] References Cited

U.S. PATENT DOCUMENTS

| 2,248,222 | 7/1941 | Ensign | 48/180 C |
| 3,357,687 | 12/1967 | Vanderpoel | 123/120 |
| 3,455,260 | 7/1969 | Mennesson | 261/DIG. 19 |
| 3,704,702 | 12/1972 | Aono | 123/179 G |
| 3,931,808 | 1/1976 | Rachel | 123/179 G |

*Primary Examiner*—S. Leon Bashore
*Assistant Examiner*—George C. Yeung
*Attorney, Agent, or Firm*—Bacon & Thomas

[57] ABSTRACT

The invention relates to an installation for supplying gaseous fuels such as LPG and natural gas to a combustion engine, said installation being provided with a membrane provided in a housing and being coupled to the valve stem of a gas control valve, the space of said membrane at the one side thereof being connected with a venturi, in which the gaseous fuel is mixed with air drawn into said venturi by the depression created in the engine when running, said connection being such that in said space prevails the depression created during the running of said motor, the other side of the membrane being in connection with the air inlet of the venturi, three springs being provided at said one side of the membrane, said springs being dimensioned and arranged in such a way that the first of said springs is compressed when a small depression, e.g. a pressure of 20 cm water column, occurs at said one side of the membrane, the second spring being compressed as the depression in said space increases, e.g. to a pressure of 15 mm Hg, the third spring being compressed when the engine decelerates, a fourth spring being provided at the other side of the membrane which trys to move the gas control valve in a direction towards its open position.

11 Claims, 8 Drawing Figures

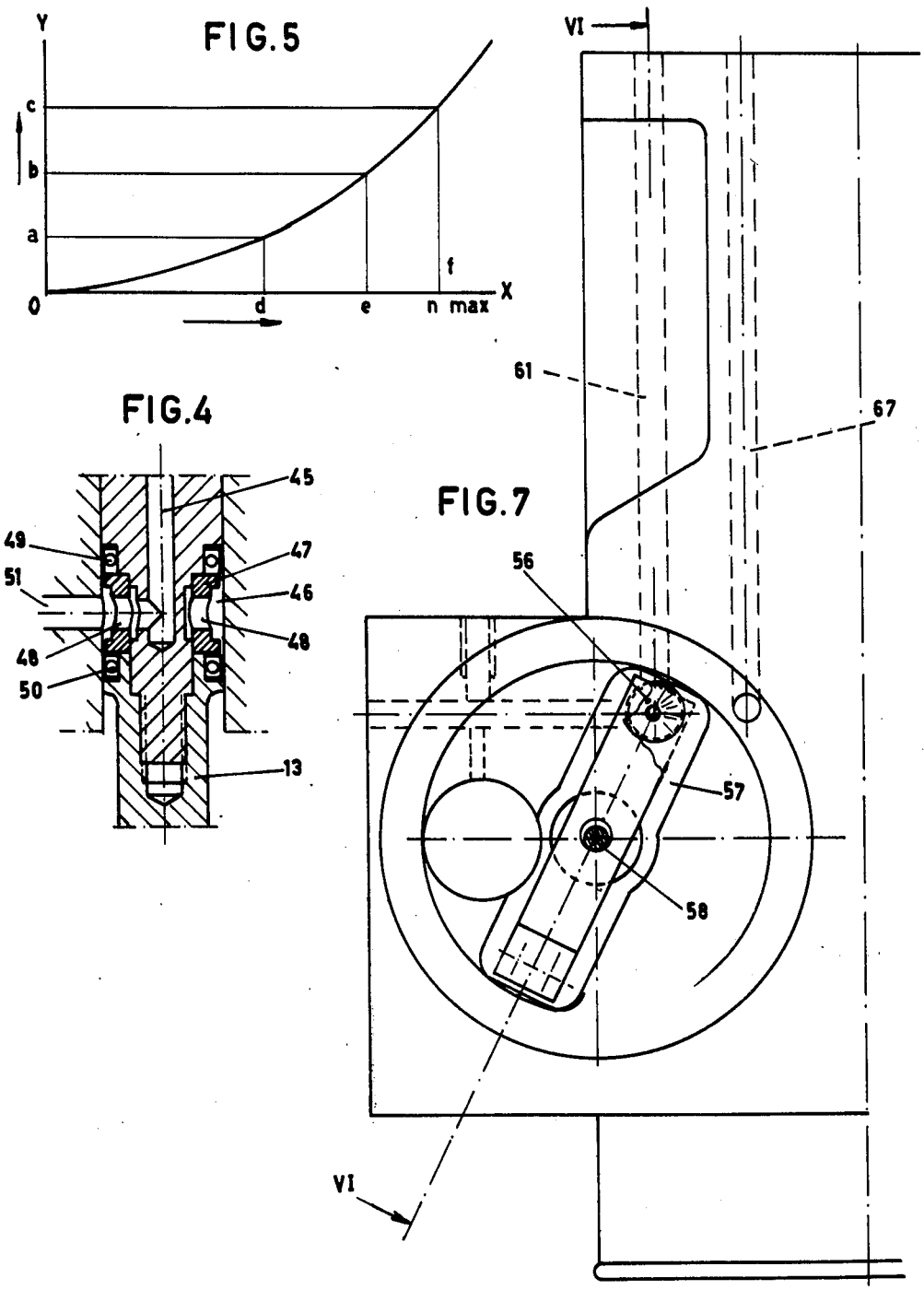

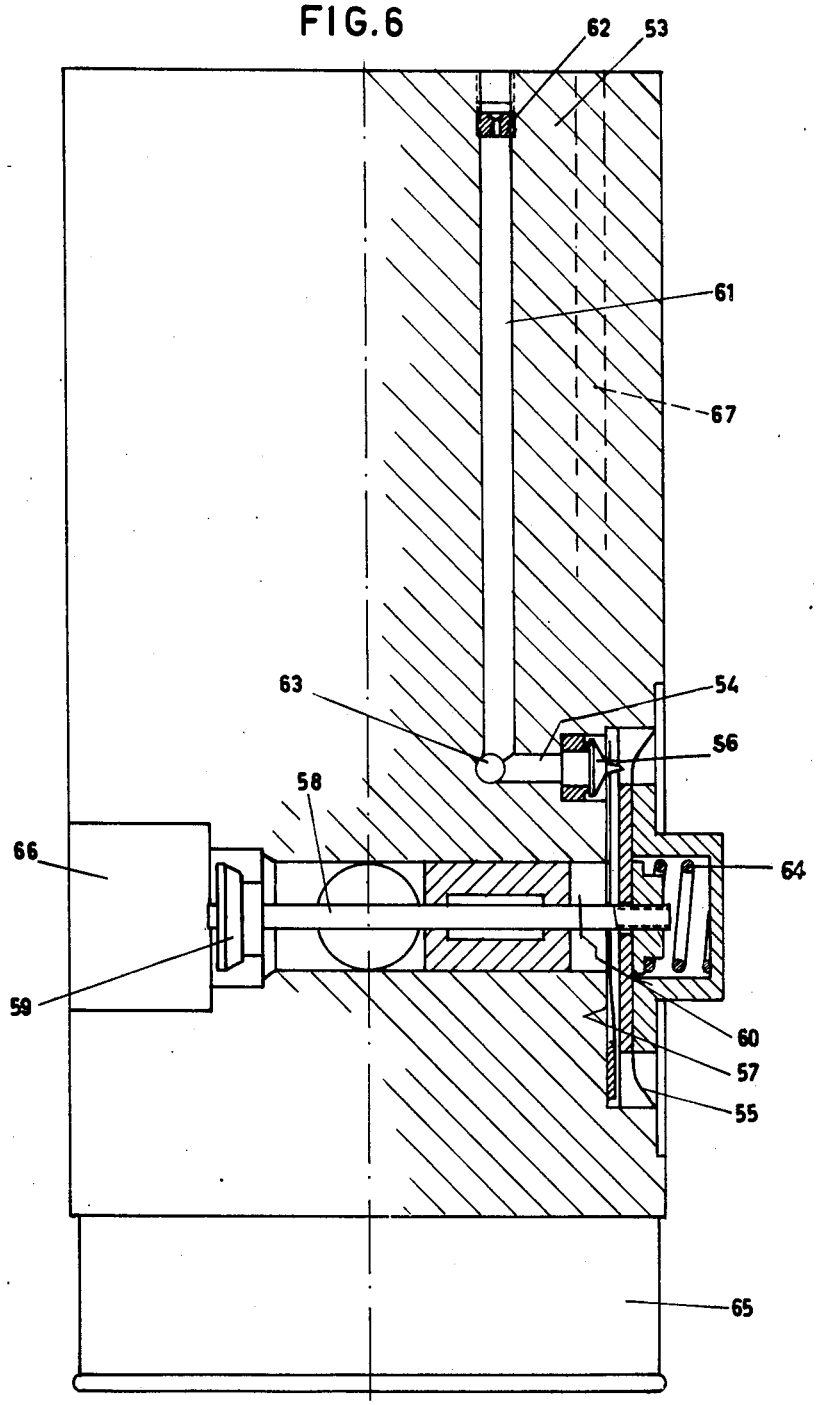

INSTALLATION FOR SUPPLYING GASEOUS FUELS, SUCH AS LPG OR NATURAL GAS, TO A COMBUSTION ENGINE

The invention relates to an installation for supplying gaseous fuels, such as LPG or natural gas, to a combustion engine, and aims to obtain an installation of this type, which occupies little space, which is of a simple construction and with which the gas supply can be regulated accurately and easily in a simple way, which installation functions completely automatically after this regulation and which can be carried out in such a way, that the same operations must be carried out as for starting and stopping a diesel engine.

This is obtained with the installation according to the invention, in that it has a casing, in which a membrane is provided which at its one side is in connection with the space behind the gas valve of the engine, in which space prevails the depression created during the running of the engine, the pipe in which the gas valve is accommodated being connected to a venturi, in which the gaseous fuel is mixed with air, which air is drawn in by the depression created in the engine, the gaseous fuel being drawn in through at least one aperture provided in the throat of the venturi, the other side of the membrane being in connection with the air inlet of the venturi, said membrane being coupled to the valve stem of a gas control valve provided in the casing, a first spring being provided which is compressed when a small depression occurs at the one side of the membrane, a second spring being provided which is compressed as the depression in the space at the one side of the membrane rises, and a third spring being provided which is compressed when the engine is decelerated, all this in such a way that the gas control valve is moved in a direction towards its closed position, whereas at the other side of the membrane a fourth spring is provided, which tries to move the gas control valve in a direction towards its open position.

A favourable embodiment of the installation according to the invention is characterized in that at the one side of the membrane a cap-shaped part is provided, which is in connection with the space at this one side of the membrane, against which cap-shaped part lies the lower end of the first spring, the upper end of this first spring lying against the upper wall of a bush provided with a flange, against which flange lies the lower end of the second spring, the upper end of this second spring lying against a first disc, which is provided in a second cap attached to the casing, against which second cap lies the upper end of a third spring, the lower end of this third spring lying against a cap-shaped plate provided with a flange, said plate is pressed by the third spring against a partition provided in the cap, said flange is provided slidingly in the cap attached to the casing, whereas the flange of the bush is provided slidingly in the cap-shaped plate, whereas the cap-shaped part can enter through a hole in the partition into touch with the flange of the bush, and the fourth spring lying with its uppr end against the cap-shaped part and with its lower end against the bottom of hole of the valve stem.

In order to set the second and the third spring independently of each other, it is possible according to the invention that the first disc is provided in an adjustable way in a second disc and that the second disc is provided in an adjustable way in the cap attached to the casing, which cap has a detachable lid.

According to the invention the valve stem can consist of two parts connected to each other, in the one end of the one part the hole being provided which extends into the space at the one side the membrane, said hole being in connection with an annular space in this one part through a channel extending into its bottom, in which space a slide is provided which is connected with a depression signal channel provided in the casing, which slide is connected with a regulator for the pressure of gaseous fuels, which regulator is connected to a gas tank, a valve being provided in the regulator, said valve being closed when the depression in the depression signal channel falls out consequence of the upward movement of the gas supply valve, because this channel will be connected with the annular space of the venturi when the valve stem moves upwards.

The membrane can co-operate with a microswitch which, when a low depression prevails, e.g. a pressure of 20 cm water column, is actuated by the membrane, which microswitch keeps the ignition system of the combustion engine in the actuated position after the starting of the engine. This microswitch can be provided in a circuit coupled in parallel to the circuit of the switch for the engine, so that the ignition system which is actuated when the engine is started, remains actuated after the engine has been started.

The springs can be carried out and provided in such a way that when the engine is started, the gas control valve is always actuated in such a way, that it is opened so far that it allows the passage of sufficient fuel to let the engine run stationarily.

According to the invention, an electrically actuated valve in the pipe from the gas tank to the evaporator/pressure regulator can be closed when the depression at the one side of the membrane falls out. The fall out of the depression above the membrane takes place when the engine is switched off.

The gas supply valve can be provided with a solenoid, which can be actuated temporarily, so that the gas supply valve is closed for a short time when this solenoid is actuated, whereas the gas supply valve returns to its initial position when the actuation of the solenoid is terminated.

The third spring can be of such dimensions that when a great depression occurs in the space of the one side of the membrane, as is the case when the combustion engine is decelerated, the gas supply valve is closed entirely.

Another embodiment of the installation according to the invention is characterized in that in the casing a three-armed depression signal channel is provided, of which the one arm extends into the space at the other side of the membrane, this mouth being closed by a valve attached to the one end of a plate spring, the other end of the plate spring being attached to the casing, the stem of the gas supply valve being provided with a projecting part in such a way that the plate spring moves upwards when the gas supply valve is closed, so that the valve attached to the plate spring is opened, the second arm of the depression signal channel being connected to the space behind the gas valve in the supply pipe of a mixture of combustion gas and air to the combustion engine, a narrowing being provided in this second arm, and the third arm being in connection with the pressure regulator.

The invention will be explained hereinafter with reference to the drawing, in which by means of example two embodiments of the regulating installation are shown.

In the drawing:

FIG. 4 shows a detail of this embodiment of the installation at an enlarged scale;

FIG. 5 shows a speed/depression diagram;

FIG. 6 shows a longitudinal section of a part of another embodiment of the installation;

FIG. 7 shows a cross section of the embodiment shown in FIG. 6 and

Figure 1:
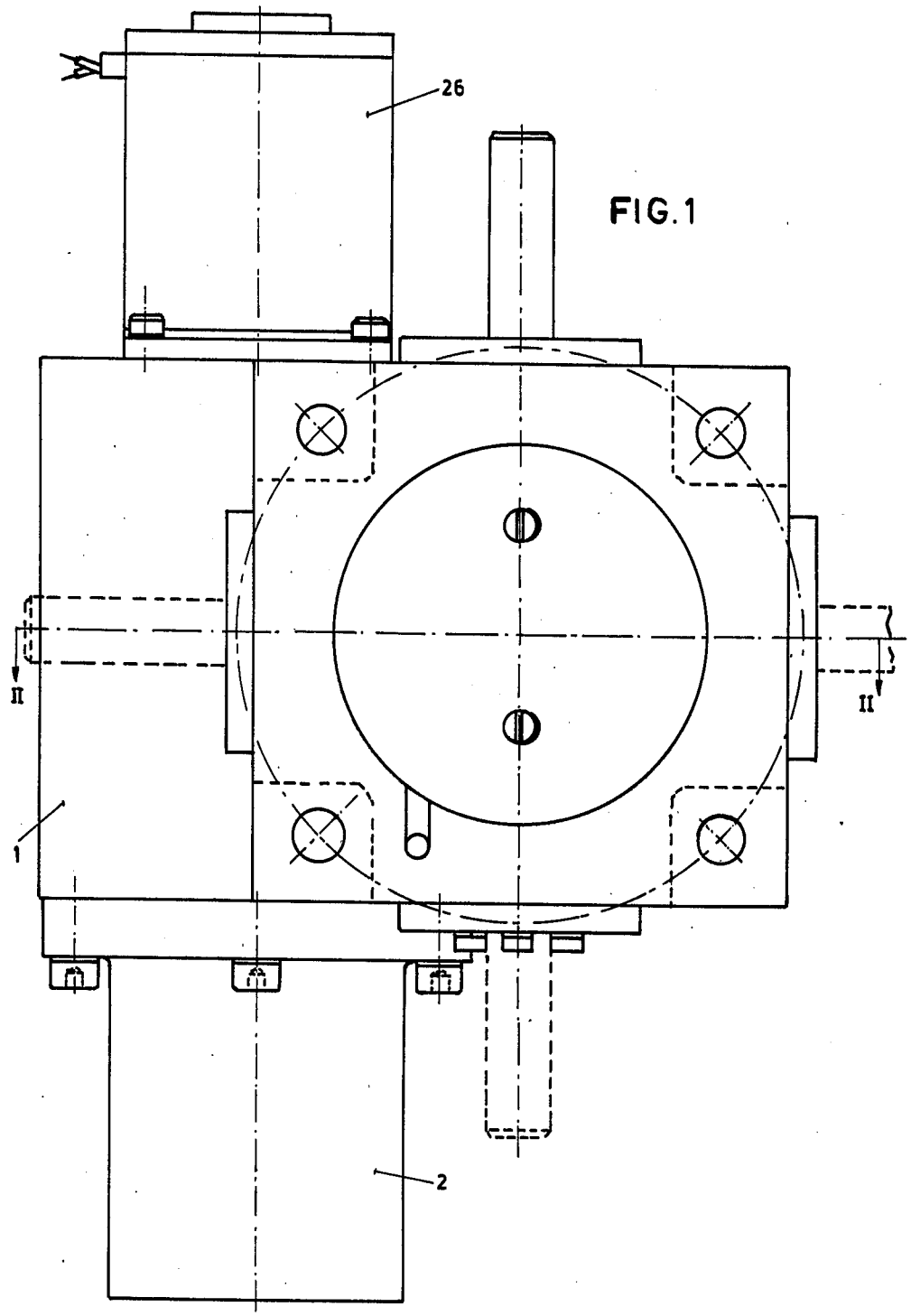
FIG. 1 shows a view of a first embodiment of the installation.
Figure 2:
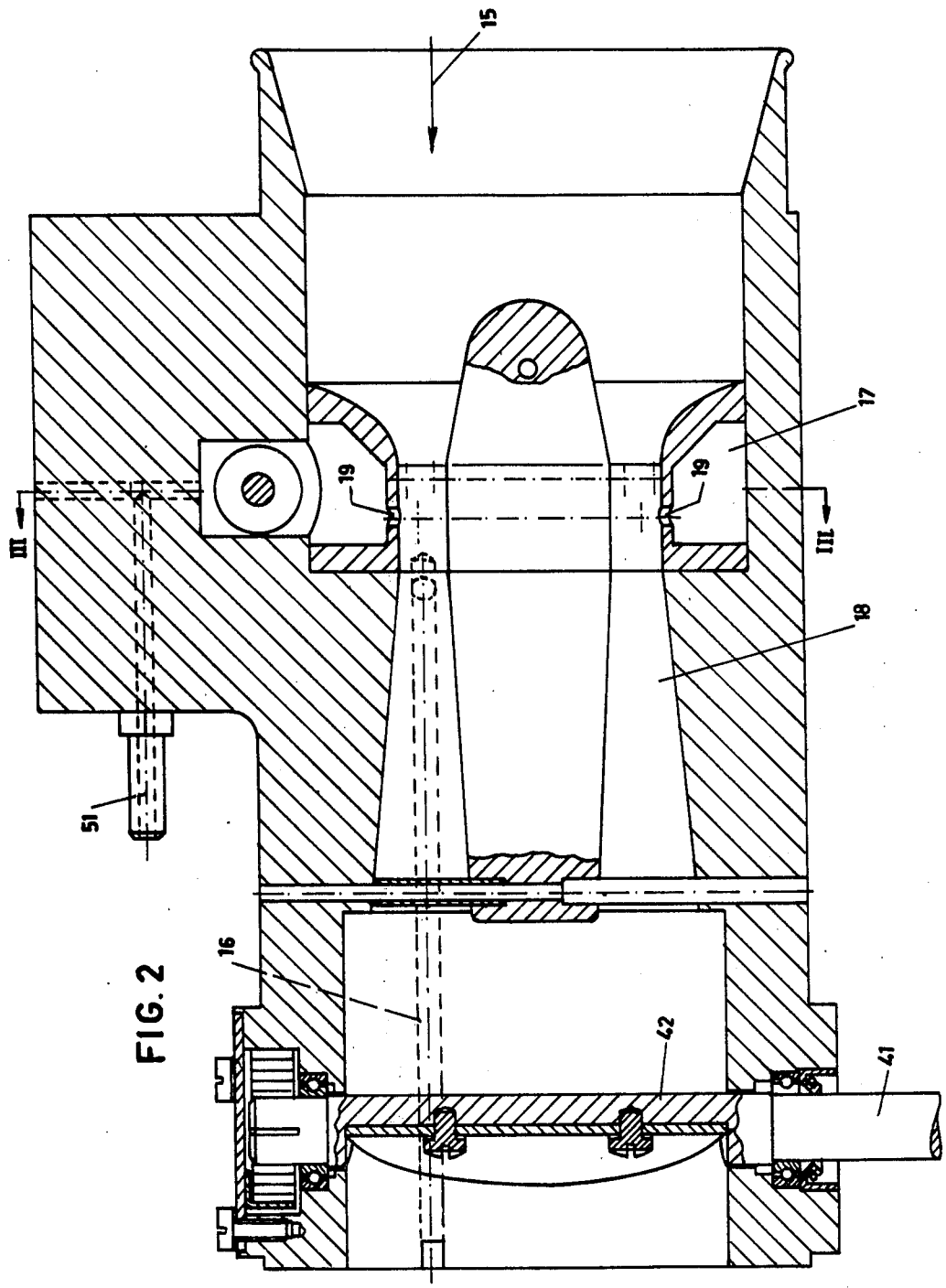
FIG. 2 shows a section along the line II—II in FIG. 1.
Figure 3:
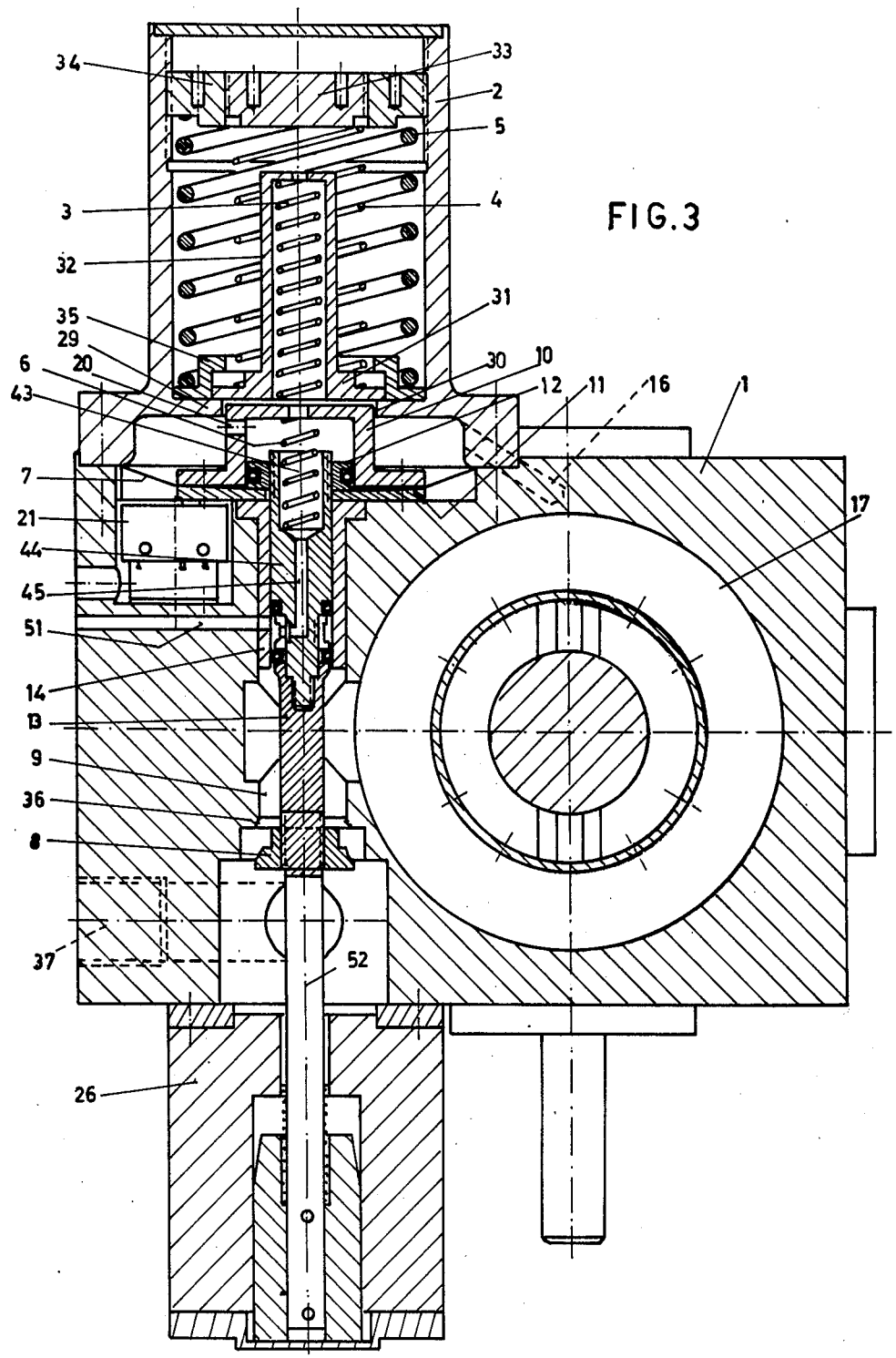
FIG. 3 shows a section along the line III—III in FIG. 2.

The embodiment of the regulating installation for the supply of gaseous fuels to a combustion engine shown in FIGS. 1-4 comprises a casing 1, to which a cap 2 is attached, in which are accomodated four springs 3, 4, 5 and 6 which are indicated by a first, second, third and fourth spring.

Between the casing 1 and the cap 2 a membrane 7 is provided, which is coupled to a gas control valve 8 in the gas supply pipe 9 by a cap-shaped part 10 at the upper side of the membrane and by a plate-shaped part 11, which is connected to the cap-shaped part 10, at the under side of this membrane.

In the cap-shaped part 10 there is a ring 12, by means of which the membrane 7 is coupled to the valve stem 13.

The one side of the membrane 7 is connected via a vacuum channel 16 to the space behind the gas valve 42 of the engine, in which space prevails the depression created during the running of the engine. The gas valve 42 is controlled by means of the shaft 41. The gas pipe in which the gas control valve 8 is accomodated, is connected to a venturi, in which the gaseous fuel is mixed with air, which air is drawn in by the depression created in the engine, in the direction of the arrow 15 shown in FIG. 2.

The annular chamber 17 provided in the venturi is connected through a number of holes 19 in its wall with the interior of the venturi 18. The annular chamber is also connected with the gas supply pipe 9, so that the combustion gas is drawn in through the holes 19 by the air streaming into the venturi, and is mixed with this air.

Holes 20 are provided in the wall of the cap-shaped part 10, so that the entire space above the membrane 7 is in connection with the engine vacuum.

The space under the membrane 7 is in connection with the space before the inlet side of the venturi.

On the cap-shaped part 10 acts the first spring 3, which is of such dimensions that already at the occurence of a very low depression, e.g. of 20 cm water column in the space above the membrane 7, the membrane travels upwards, so that a microswitch 21 actuated by the plate 11 is closed.

Figure 8:
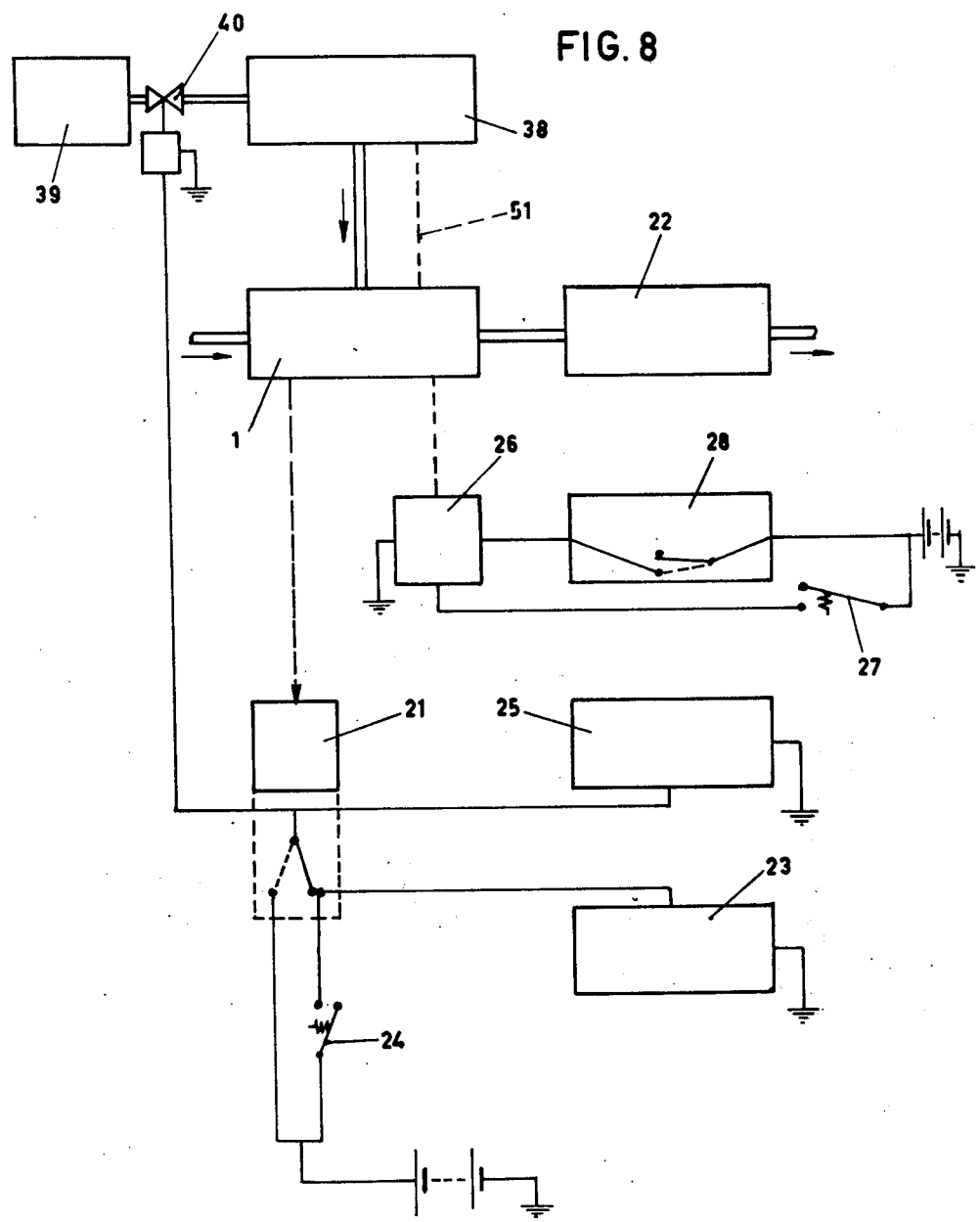
FIG. 8 shows a scheme of a system for the supply of gaseous fuels to a combustion engine.

The depression of 20 cm water column occurs already when the engine 22 shown in FIG. 8 is started by means of the starting motor 23. Before the starting of the engine 22 the starting switch 24 is closed.

When its contact tongue is pulled over, the microswitch 21 actuated the ignition system 25 of the engine 22 and also opens an electric valve in the connection pipe from the gas tank to the pressure regulator 38.

When the engine is switched off by means of the engine stopping switch 27, the depression at the one side of the membrane 7 falls out and the contact tongue of the microswitch 21 returns to its position as shown in FIG. 8. In this way the ignition system 25 is switched off.

As results from FIG. 8, the engine stopping switch 27 is provided in a parallel circuit with the circuit of the automatic gearbox 28.

The installation is provided with a second spring 4, which at full load regulates the engine torque in such a way, that it is lower at high speeds than at low speeds. This spring is of such dimensions that in case of a depression, e.g. higher than 15 mm Hg, the compression thereof begins and the complete compression takes place at a higher depression.

FIG. 5 shows a speed/depression diagram of the functioning of this second spring 4. The speed of the engine is shown on the X axis and the depression on the Y axis of this diagram. In this diagram a represents the initial compression of the second spring 4 and b the complete compression of this spring. The point d on the X axis represents the speed of the engine at the initial compression of the second spring 4. The point e on the X axis represents the speed of the engine at which the second spring 4 is compressed completely, whereas the point f represents the maximum engine speed. Between the points d and f the engine torque is lower than between the points o and d. The point c represents the depression at full load, at which the speed of the engine is maximum.

The cap-shaped part 10 is located with its upper end in a hole 30 provided in a transverse wall 29 of the cap 2. Opposite to the upper wall of the cap-shaped part 10 there is a bush 32 provided with a flange 31. The second spring 4 lies with its lower end against this flange 31 and with its upper end against a threaded, adjustable disc 33 provided in the cap 2, which disc 33 engages in a thread of a hole in a second adjustable disc 34. The second disc 34 is provided with thread which engages in a thread in the inner wall of the cap 2. By means of the discs 33 and 34 the springs 4 and 5 can be set independently of each other.

In the upper wall of the bush 32 there is a hole, so that the same vacuum prevails in the entire internal space of the cap 2 as in the space above the membrane 7.

The flange 31 is carried out in such a way, that it fits slidingly in a cap-shaped plate 35, which is provided with a flange, which is slidingly mobile in the cap 2.

When the depression above the membrane 7 increases, because the speed of the engine 22 increases, to e.g. 15 mm Hg, the membrane 7 travels upwards and, as said above, the compression of the spring 4 begins, because the cap-shaped part 10 is moved upwards by the membrane 7. When the depression increases further under the increase of the speed of the engine, the cap-shaped part 10 comes into touch with the flange 31 of the bush 32, so that the flange 31 moves into the cap-shaped part of the plate 35. This causes the valve 8 to travel to its seating 36, until the depression at full load is reached.

The third spring 5 is of such dimensions, that it is compressed at a depression which is higher than at stationary running of the engine, therefore at deceleration. This moves the cap-shaped plate 35 in the cap 2 upwards against the force of the third spring 5, so that the gas control valve 8 closes the gas supply 37 of gas to the annular chamber. The stationary gas flow is blocked simultaneously by letting fall out a depression signal in the depression signal channel 51 to the evaporator/pressure regulator, by connecting this channel to the annular chamber 17. The depression in the annular chamber 17 is negligeable during the deceleration, because the gas valve 42 to the engine, which valve is actuated by the pedal provided on the actuating rod 41, is then closed almost entirely.

The depression signal is directed into the cap-shaped part 10 through a hole 43 of a rod 44 (FIGS. 3 and 4) which is connected with the valve stem 13, said hole being in connection with an annular space 46 by a channel 45 extending into its bottom. The rod 44 is connected slidingly in the cap-shaped part 10 and sealed with an O-ring to said cap-shaped part 10. In said hole is located the under end of the spring 6, which tries to move the gas control valve 8 towards its opened position.

In the annular space 46 there is a slide 47, which is provided with holes 48, through which the annular space 46 is in connection with the channel 45. Above and under the slide 47 a sealing ring 49, respectively 50 is provided. When the gas control valve 8 is open, the annular space 46 is in connection with the depression signal channel 51.

When the valve stem travels upwards in case of deceleration, the slide 47, which is fixed on this valve stem, travels upwards and the connection between the channel 45 and the depression signal channel 51 is interrupted, so that the depression signal falls out. It is to be observed that when a gas regulator for the gaseous fuel has no depression signal construction, this depression signal can be left out of the installation according to the invention.

The engine can be stopped by closing the gas control valve 8 against the action of the spring 6, by actuating for a short time the solenoid 26 in which an actuating rod 52 for the gas control valve 8 is provided. The actuation during a short time of the solenoid 26 takes also place during the shifting of the automatic gearbox 28, so that the engine runs idle then. After the short actuation of the solenoid 26, which takes place preferably by means of a relay, the gas control valve 8 returns to its initial position.

In the embodiment shown partly in FIGS. 6 and 7 of the installation according to the invention, the casing 53 of the installation comprises a three-armed depression signal channel, of which the arm 54 extends into the space at one side of a membrane, whereas the mouth of this arm can be closed by a valve 56. This valve is provided at the one end of a plate spring 57, of which plate spring 57 the other end is connected to the casing in the space at the one side of the membrane. The valve stem 58 of the gas supply valve 59 is provided with a projection 60 and passes through a hole in the plate spring 57. When the gas supply valve 59 is closed, the plate spring 57 is lifted by the projection 60, so that the valve 56 is opened.

The second arm of the depression signal channel is connected with the space behind the not-shown gas valve for the supply of the mixture of gaseous fuel and air to the engine, which is formed in the venturi. In the end part of this second arm a narrowing 62 is provided.

The third arm 63 of the depression signal channel is connected with the depression connection of the pressure regulator.

Of the four springs which are provided in the installation, only the spring 64 which corresponds to the spring 6, is shown, which is provided in the cap attached to the membrane.

The space at the other side of the membrane is connected with the outside air through the inlet of the venturi 65.

The above-described installation works as follows:

When the gas supply valve 59 is closed when the combustion engine is stopped, when there is deceleration of the combustion engine and when the gearbox is shifted, the valve 56 in the space at the other side of the membrane is opened. This causes the depression signal to fall out, because air flows into the depression signal channel. The narrowing 62 is provided in the second arm 61 of the depression signal channel in order to prevent that the air in this channel escapes to space behind the gas valve.

As the depression signal falls out, the supply of the stationary gas flow to the gas supply channel 66 is interrupted, like in the first embodiment.

The space at this side of the membrane 55 is connected through a partly shown channel 67 with the depression prevailing in the combustion engine.

Further this embodiment is carried out and functions in the same way as the embodiment shown in FIGS. 1–4.

It will be obvious that the invention is not restricted to the embodiments as described above and as shown in the drawing, but that the parts thereof can be modified in numerous ways, without leaving the framework of the invention.

We claim:

1. A device for regulating of the gas-air mixture of a gas, such as e.g. LPG or natural gas, to a combustion engine, said engine having a casing in which a membrane is provided, one side of said membrane is connected to the inlet manifold downstream of the throttle of the engine and said one side of the membrane is connected to the valve stem of a gas control valve, said throttle being arranged in a passage means which is connected to a venturi in which the gaseous fuel is mixed with air, the other side of the membrane being in connection with the air inlet of the venturi, at said one side of the membrane, three springs being provided for urging the throttle towards its closed position of which the first spring is a weak spring which is compressed when a low depression prevails at the one side of the membrane, the second spring is a strong spring which is also compressed when a higher depression prevails at said one side of the membrane and the third spring is the strongest spring which is also compressed when a still higher depression prevails at said one side of the membrane, a fourth spring being provided at the other side of the membrane said fourth spring urging said gas control valve towards its open position.

2. A device according to claim 1, characterized in that a first cup-shaped member is provided at the one side of the membrane, the lower end of the first spring lying against said first cup-shaped member, the other end of said first spring lying against the upper wall of a bush provided with a flange, against which flange lies one end of the second spring, the other end of said second spring lying against a disc, which is provided in a second cup-shaped member attached to the casing, the one end of the third spring lying against said second cup-shaped member and the other end of said third spring lying against a third cup-shaped member provided with a flange, said third cup-shaped member being pressed by the third spring against transverse wall provided in the second cup-shaped member, which flange is provided slidingly in the second cup-shaped member attached to the casing, the flange of the bush being provided slidingly in the third cup-shaped member, said first cup-shaped member extending through a hole in the transverse wall into contact with the flange of the bush, the fourth spring lying with one end against the first cup-shaped member and with its other end against the bottom of a hole in the valve stem.

3. A device according to claim 2, characterized in that the disc is adjustable in a second disc and that the second disc is adjustable in the second cup-shaped member attached to the casing, which second cup-shaped member has a detachable lid.

4. A device according to claim 2 characterized in that the valve stem consists of two parts connected to each other, in the one end of one part a hole being provided, which opens in the space at the one side of the membrane, said hole being in connection with an annular space in said one part through a channel, a slide being provided in said space, which is connected to a depression signal channel provided in the casing, said slide being connected to a regulator for the pressure of gaseous fuels, said regulator being connected to a gas tank, in the regulator a valve being provided, which is closed when the depression in the depression signal channel drops to zero in consequence of the upward movement of the gas control valve, the channel being connected with the annular space of the venturi when the valve stem moves upwards.

5. A device according to claim 1, in which the membrane cooperates with a microswitch which, when a low depression prevails, is actuated by the membrane, which microswitch keeps the ignition system of the combustion engine in closed position after the engine has been started.

6. A device according to claim 1, in which the membrane cooperates with a microswitch which, when a low depression prevails, is actuated by the membrane, which microswitch keeps the ignition system of the combustion engine in closed position after the engine has been started, a circuit being provided parallel to the circuit of the starting switch of the starting motor, which circuit is switched on by a continuation of the microswitch.

7. A device according to claim 1, in which the springs have such a strength and are arranged in such a way, that when the engine is started, the gas control valve is always actuated in such a way, that it allows the passage of sufficient gaseous fuel to let the engine run idling.

8. A device according to claim 1, in which an electrically actuated valve in the passage from a gas tank to a pressure regulator is closed when the depression at the one side of the membrane drops to zero.

9. A device according to claim 1, in which the gas control valve is provided with a solenoid which can be actuated temporarily, so that the gas control valve is closed for a short time when this solenoid is actuated whereas the gas control valve returns to its open position after the actuation of the solenoid.

10. A device according to claim 1, in which the third spring is of such dimensions that when a high depression occurs in the space at the one side of the membrane, as is the case when the combustion engine is decelerated, the gas control valve is closed entirely.

11. A device according to claim 1, in which a three-branched depression signal channel is provided in the casing, one branch of said depression signal channel opening into the space at the other side of the membrane, the opening of said one branch being closed by a valve attached to the one end of a plate spring, the other end of said plate spring being attached to the casing, the stem of the gas control valve being provided with a projecting part in such a way that the plate spring moves upwards when the gas control valve is closed, so that the valve attached to the plate spring is opened, the second branch of the depression signal channel being connected to the inlet manifold downstream of the throttle in the supply pipe of the engine, a restriction being provided in said second branch, the third branch being in connection with the pressure regulator.

* * * * *